(12) United States Patent
Miyashita et al.

(10) Patent No.: US 12,333,437 B2
(45) Date of Patent: Jun. 17, 2025

(54) ARITHMETIC APPARATUS AND ARITHMETIC METHOD (71) Applicant: Kioxia Corporation, Tokyo (JP)

(72) Inventors: Daisuke Miyashita, Kawasaki (JP); Asuka Maki, Kawasaki (JP)

(73) Assignee: Kioxia Corporation, Tokyo (JP)

( * ) Notice: Subject to any disclaimer, the term of this patent is extended or adjusted under 35 U.S.C. 154(b) by 1050 days.

(21) Appl. No.: 17/195,865

(22) Filed: Mar. 9, 2021

(65) Prior Publication Data

US 2022/0076122 A1 Mar. 10, 2022

(30) Foreign Application Priority Data

Sep. 9, 2020 (JP) .................................. 2020-151296

(51) Int. Cl.
*G06N 3/08* (2023.01)
*G06F 3/06* (2006.01)
(Continued)

(52) U.S. Cl.
CPC ........... *G06N 3/082* (2013.01); *G06F 3/0604* (2013.01); *G06F 3/0658* (2013.01); *G06F 3/0685* (2013.01); *G06N 3/04* (2013.01)

(58) Field of Classification Search
CPC .................................. G06N 3/082; G06N 3/04
See application file for complete search history.

(56) References Cited

U.S. PATENT DOCUMENTS 6,067,536 A 5/2000 Maruyama et al.
2015/0324686 A1* 11/2015 Julian ...................... G06N 3/08
706/25

(Continued)

FOREIGN PATENT DOCUMENTS

JP 10-055346 A 2/1998
JP 11-159387 A 6/1999
(Continued)

OTHER PUBLICATIONS

Sian Jin, "DeepSZ: A Novel Framework to Compress Deep Neural Networks by Using Error-Bounded Lossy Compression", 2019 (Year: 2019).*

(Continued)

*Primary Examiner* — Van C Mang
(74) *Attorney, Agent, or Firm* — Oblon, McClelland, Maier & Neustadt, L.L.P.

(57) ABSTRACT

According to one embodiment, an arithmetic apparatus includes a non-volatile first memory, a second memory, and a controller. The first memory stores a model to be trained. The second memory has a smaller storage capacity than the first memory. The controller executes learning processing that updates a first parameter of the model based on a loss value obtained by inputting training data into the model stored in the first memory, and stores cumulative update information indicating a difference of the first parameter before and after the update in the second memory. In addition, the controller executes the learning processing using a second parameter in which the cumulative update information stored in the second memory is reflected in the first parameter read from the model stored in the first memory, and stores a difference between a third parameter obtained by updating the second parameter and the first parameter, in the second memory as the cumulative update information.

14 Claims, 4 Drawing Sheets (51) Int. Cl.
    *G06N 3/04*    (2023.01)
    *G06N 3/082*   (2023.01)

(56) References Cited

U.S. PATENT DOCUMENTS

2018/0277224 A1* 9/2018 Shirota ................ G11C 7/1048
2020/0372401 A1* 11/2020 Mallick ............... H04L 67/1097

FOREIGN PATENT DOCUMENTS

| JP | 2000-305589 A | 11/2000 |
| JP | 2017-519282 A | 7/2017 |
| WO | WO 2015/175155 A1 | 11/2015 |

OTHER PUBLICATIONS

Florian Fiebig, "Memory consolidation from seconds to weeks: a three-stage neural network model with autonomous reinstatement dynamics" (Year: 2014).*

* cited by examiner

FIG.1

FIG.2

ARITHMETIC APPARATUS AND ARITHMETIC METHOD

CROSS-REFERENCE TO RELATED APPLICATIONS

This application is based upon and claims the benefit of priority from Japanese Patent Application No. 2020-151296, filed on Sep. 9, 2020; the entire contents of which are incorporated herein by reference.

FIELD

Embodiments described herein relate generally to an arithmetic apparatus and an arithmetic method.

BACKGROUND

Conventionally, models have been created by machine learning such as deep learning. When performing machine learning, memories for storing models are required. In addition, in order to perform machine learning at a higher speed, high-speed memories such as a dynamic random access memory (DRAM) and a static random access memory (SRAM) are used for storing models.

In recent years, the scale of models has been increasing, and accordingly it is required to increase the capacity of storage memories. Therefore, it is expected that NAND flash memories, which can be easily increased in capacity, will be used for storing models. However, since data is rewritten every time a parameter is updated by machine learning, it is necessary to consider endurance (the number of times of rewriting) of the NAND flash memories.

DETAILED DESCRIPTION

In general, according to one embodiment, an arithmetic apparatus includes a non-volatile first memory, a second memory, and a controller. The first memory stores a model to be trained. The second memory has a smaller storage capacity than the first memory. The controller executes learning processing that updates a first parameter of the model based on a loss value obtained by inputting training data into the model stored in the first memory, and stores cumulative update information indicating a difference of the first parameter before and after the update in the second memory. In addition, the controller executes the learning processing using a second parameter in which the cumulative update information stored in the second memory is reflected in the first parameter read from the model stored in the first memory, and stores a difference between a third parameter obtained by updating the second parameter and the first parameter, in the second memory as the cumulative update information.

Exemplary embodiments of the arithmetic apparatus and an arithmetic method will be described in detail with reference to the accompanying drawings. The present invention is not limited to the following embodiments.

Figure 1:
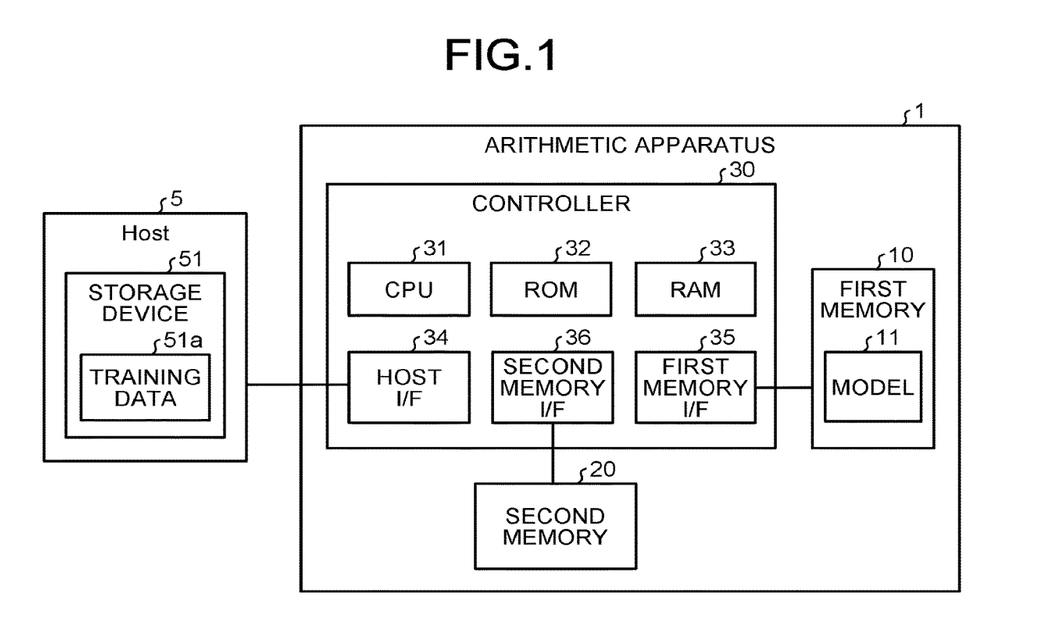
FIG. 1 is a schematic diagram illustrating an example of a configuration of a learning system according to one embodiment.

FIG. 1 is a schematic diagram illustrating an example of a configuration of a learning system including an arithmetic apparatus 1 according to one embodiment. The learning system includes the arithmetic apparatus 1 and a host 5. The arithmetic apparatus 1 is configured to be connectable to the host 5.

Here, the host 5 is an information processing device such as a personal computer or a server. The host 5 includes a storage device 51 in addition to a processor (not illustrated) such as a central processing unit (CPU).

The storage device 51 is realized by, for example, a hard disk drive (HDD) or the like, and stores a large amount of training data 51a. The training data 51a is a data set for machine learning (hereinafter, also simply referred to as learning) a model 11 described later. The training data 51a includes, for example, various input data input to the model 11 and ground truth label for comparison with output data output corresponding to the input data. It should be noted that a field or event to be learned is not particularly limited.

The arithmetic apparatus 1 includes a first memory 10, a second memory 20, and a controller 30. The first memory 10, the second memory 20, and the controller 30 are electrically connected by a bus or the like.

The first memory 10 includes, for example, a NAND type flash memory (hereinafter, also referred to as a NAND memory) or a non-volatile memory such as a solid state drive (SSD) including a NAND memory, and stores the model 11 to be trained. The model 11 has a neural network configuration such as a multi-layer perceptron (MLP) having at least one hidden layer (intermediate layer) (see FIG. 2).

The second memory 20 includes, for example, a memory such as DRAM or SRAM. In the present embodiment, the second memory 20 is used as a working memory when the model 11 is trained. In the present embodiment, a storage capacity of the second memory 20 is smaller than that of the first memory 10.

The controller 30 includes a CPU 31, a ROM 32, a RAM 33, a HOST I/F 34, a first memory I/F 35, and a second memory I/F 36. Each of these units is communicably connected to each other via, for example, a bus.

The CPU 31 is an example of a processor that controls the controller 30 and the arithmetic apparatus 1. The CPU 31 may be a micro processing unit (MPU), a graphic processing unit (GPU), a field-programmable gate array (FPGA), an application specific integrated circuit (ASIC), or the like.

The ROM 32 stores various programs. The RAM 33 is a memory used as a buffer or a work area of the CPU 31. The CPU 31 executes various processing by operating according to a program stored in the ROM 32 and expanded in the RAM 33.

The HOST I/F 34 executes data transfer to and from the host 5 under the control of the CPU 31. The first memory I/F 35 executes data transfer to and from the first memory 10 under the control of the CPU 31. The second memory I/F 36 executes data transfer to and from the second memory 20 under the control of the CPU 31.

In the above configuration, the arithmetic apparatus 1 (specifically, the controller 30) executes a learning processing for learning the model 11 stored in the first memory 10 by using the training data 51*a*. Specifically, the controller 30 reads a parameter from the model 11 stored in the first memory 10, and executes a learning processing that updates the parameter based on a loss value indicating a degree of difference between an output value obtained by inputting training data 51*a* into the model 11 and a correct answer value (ground truth label). Here, the model 11 is configured by, for example, a neural network as illustrated in FIG. 2.

Figure 2:
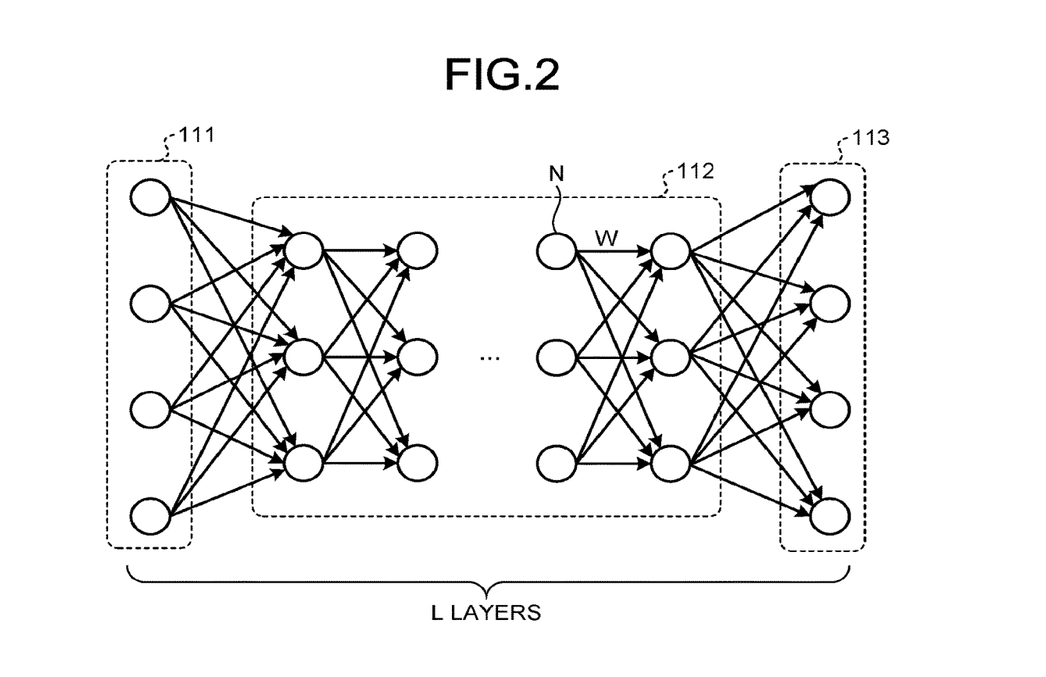
FIG. 2 is a diagram schematically illustrating a configuration of a model stored in a first memory of FIG. 1.

FIG. 2 is a diagram schematically illustrating a configuration of the model 11 stored in the first memory 10. As illustrated in FIG. 2, the model 11 is composed of a neural network including an input layer 111, an intermediate layer (hidden layer) 112, and an output layer 113. Here, it is assumed that the number of layers from the input layer 111 to the output layer 113 is L (provided, L≥3).

Each layer is composed of a plurality of nodes N. Further, the layers are connected by connection between the nodes N, and a weight indicating strength of the connection is defined by a parameter W. For example, the parameter W is represented by a multidimensional array for each layer. In the model 11 in an initial state in which the model 11 is just stored in the first memory 10, the parameter W is a random value (random number). In the learning processing described later, an operation for adjusting a value of the parameter W is performed by using a method such as a gradient descent method.

By the way, in the model 11 generated by deep learning, since the number of the parameters W is enormous, the storage capacity for storing the model 11 also needs to be large. Therefore, in the present embodiment, the storage capacity of the first memory 10 is set to be larger than that of the second memory 20. With such a configuration, the first memory 10 can store a large-scale model generated by deep learning or the like.

On the other hand, in the present embodiment, the second memory 20 is used as a working memory when the model 11 is trained. Specifically, the second memory 20 stores information (hereinafter, also referred to as cumulative update information) indicating a difference value between each of the parameters W read from the first memory 10 and the parameter W after being updated.

Although the second memory 20 and the controller 30 are separate bodies in FIG. 1, the controller 30 may incorporate the second memory 20. Further, the host 5 may incorporate the arithmetic apparatus 1.

Figure 3:
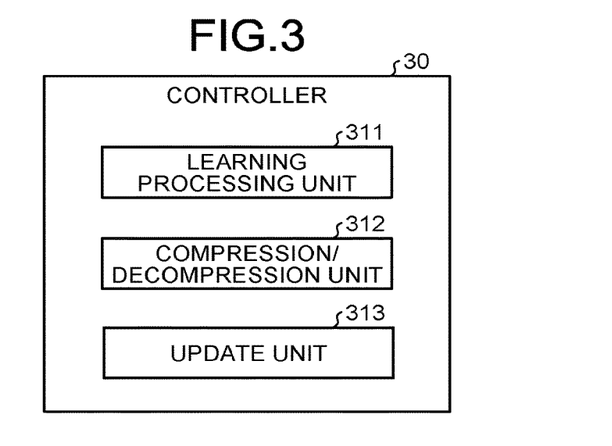
FIG. 3 is a schematic diagram illustrating an example of a functional configuration of a controller according to the embodiment.

Next, a functional configuration of the controller 30 will be described. FIG. 3 is a schematic diagram illustrating an example of the functional configuration of the controller 30 according to the embodiment.

As illustrated in FIG. 3, the controller 30 includes a learning processing unit 311, a compression/decompression unit 312, and an update unit 313. Each of functions of the learning processing unit 311, the compression/decompression unit 312, and the update unit 313 is realized, for example, by the CPU 31 executing a program stored in the ROM 32. Further, each of the functions of the learning processing unit 311, the compression/decompression unit 312, and the update unit 313 may be realized, for example, by cooperation between the CPU 31 and the processor of the host 5.

The learning processing unit 311 executes the learning processing of the model 11 stored in the first memory 10 by using the training data 51*a* stored in the storage device 51 of the host 5. Specifically, the learning processing unit 311 executes the learning processing for adjusting parameters of the model 11 stored in the first memory 10 while updating the cumulative update information stored in the second memory 20. Details of the learning processing performed by the learning processing unit 311 will be described later.

The compression/decompression unit 312 executes compression processing for compressing a data amount of the cumulative update information and decompression processing for decompressing the compressed cumulative update information. Specifically, the compression/decompression unit 312 compresses the data amount of the cumulative update information and stores the compressed data in the second memory 20 by cooperating with the learning processing unit 311 when the cumulative update information is stored in the second memory 20. Further, the compression/decompression unit 312 decompresses the read cumulative update information and outputs the decompressed data by cooperating with the learning processing unit 311 and the update unit 313 when the cumulative update information is read from the second memory 20.

The compression method is not particularly limited, and a known technique can be used. For example, the compression/decompression unit 312 may compress the cumulative update information by using a lossless compression method such as Huffman coding. In this case, the compression/decompression unit 312 decompresses the cumulative update information by using a decompression method corresponding to the compression method.

Further, the compression method may be a lossy compression method. For example, the compression/decompression unit 312 may perform pruning that invalidates a less important difference value among difference values represented by the cumulative update information to zero or the like by cooperating with the learning processing unit 311. In this case, the compression/decompression unit 312 may perform invalidation processing that leaves the ones of the difference values represented by the cumulative update information, the ones having an absolute value equal to or greater than a threshold value, and sets the rest of the difference values to zero or the like. Further, for example, the compression/decompression unit 312 may perform processing of invalidating a certain number or a certain ratio of the difference values in ascending order from the one of the absolute value of difference values represented by the cumulative update information. Then, the compression/decompression unit 312 compresses the cumulative update information that has been invalidated by using a compressed row storage method (compressed sparse row) or the like to compress the data amount of the cumulative update information.

As another example of lossy compression, the data amount of the cumulative update information may be compressed by performing quantization that reduces the number of bits representing the difference values represented by the cumulative update information. For example, in a case where the cumulative update information is represented by a single-precision floating-point number (32 bits), the compression/decompression unit 312 compresses the data amount of the cumulative update information by representing the cumulative update information as an 8-bit integer or the like.

As described above, in the arithmetic apparatus 1, since the data amount of the cumulative update information can be stored in the second memory 20 in a compressed state, the storage capacity of the second memory 20 can be effectively used. As a result, since the arithmetic apparatus 1 can store a large amount of the cumulative update information in the second memory 20, it is possible to correspond to the model 11 generated by deep learning or the like in which the number of the parameters W is enormous.

In a case where the cumulative update information is compressed by using pruning, which is one example of the lossy compression described above, the compression/decompression unit 312 executes decompression processing of the cumulative update information by a decompression method according to the compression method such as a compressed row storage method. Further, in a case where the cumulative update information is compressed by using quantization, which is another example of the lossy compression described above, the compression/decompression unit 312 executes decompression processing for returning the number of bits of the cumulative update information to the original number of bits. For example, the compression/decompression unit 312 executes decompression processing for converting (casting) the number of bits of the cumulative update information compressed into an 8-bit integer into a single-precision floating-point number. Further, a form may be employed in which, after compression is performed using either or both of pruning and quantization, compression is performed by lossless compression such as the above-mentioned Huffman coding. In this case, the compression/decompression unit 312 also executes the decompression processing for decompressing the lossless compression performed on the cumulative update information.

The update unit 313 executes update processing for updating each of the parameters W stored in the model 11 by reflecting the update information stored in the second memory 20, into the model 11 stored in the first memory 10. Specifically, the update unit 313 updates the parameter W of the model 11 at a certain timing by cooperating with the learning processing unit 311.

Figure 4:
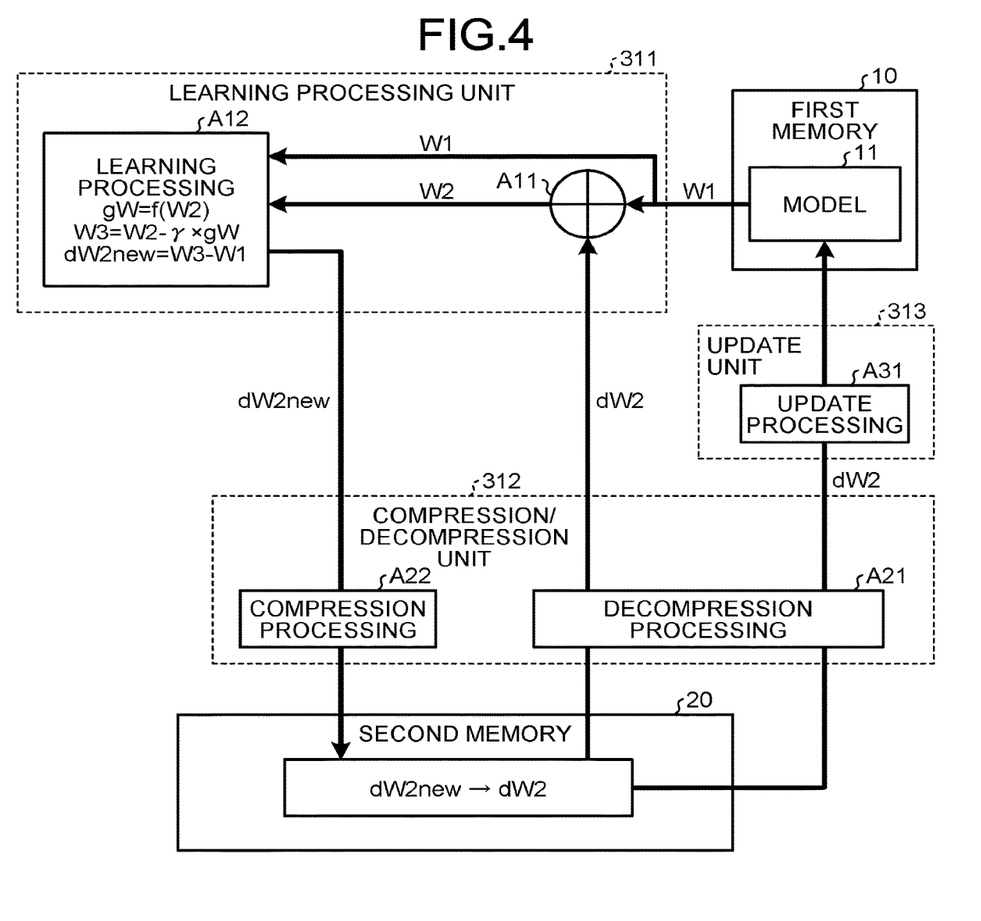
FIG. 4 is a diagram for explaining an operation of the controller according to the embodiment.

Next, operations of the learning processing unit 311, the compression/decompression unit 312, and the update unit 313 described above will be described with reference to FIG. 4. FIG. 4 is a diagram for explaining the operation of the controller 30. FIG. 4 schematically illustrates a flow of data associated with the learning processing.

First, the learning processing unit 311 inputs the training data 51a read from the storage device 51 of the host 5 into the model 11 stored in the first memory 10, and calculates the difference between the output value of the model 11 and the correct answer value. As a result, the learning processing unit 311 executes forward processing for evaluating the loss value (prediction accuracy) at the current parameter W. The learning processing unit 311 starts backward processing in which the parameter W of each layer of the model 11 is sequentially updated from a side of the output layer 113 to a side of the input layer 111 based on evaluation results obtained by the forward processing.

In the backward processing, the learning processing unit 311 selects a layer to be updated (hereinafter, also referred to as a target layer) from the model 11 stored in the first memory 10, and reads a first parameter W1 related to the target layer. Specifically, the learning processing unit 311 selects a target layer for each layer from the output layer 113 to the input layer 111.

Subsequently, when cumulative update information dW2 corresponding to the target layer is stored in the second memory 20, the learning processing unit 311 reads the corresponding cumulative update information dW2 from the second memory 20. The cumulative update information dW2 will be described later. Here, the compression/decompression unit 312 performs decompression processing A21 on the cumulative update information dW2 when the cumulative update information dW2 is read from the second memory 20.

Next, the learning processing unit 311 executes addition processing A11 that reflects the cumulative update information dW2 read from the second memory 20 in the first parameter W1 read from the first memory 10 based on a following equation (1) so that a second parameter W2 is derived.

$$W2 = W1 + dW2 \tag{1}$$

Here, the second parameter W2 represents the latest parameter W in which results of the learning processing (parameter update results) so far are reflected, as will be described later. When the cumulative update information dW2 is not stored in the second memory 20, that is, when the learning processing is performed on the target layer for the first time, the cumulative update information dW2 is not added, and thus the second parameter W2=the first parameter W1.

Subsequently, the learning processing unit 311 executes learning processing A12 for calculating a gradient gW for reducing the loss value from the second parameter W2 by using an algorithm such as a gradient descent method. For example, assuming that an evaluation function f calculates the gradient gW, the learning processing unit 311 inputs the second parameter W2 to the evaluation function f as indicated in a following equation (2), so that the gradient gW for the second parameter W2 is calculated. The evaluation function f is not particularly limited, and a known technique related to machine learning can be used.

$$gW = f(W2) \tag{2}$$

Subsequently, the learning processing unit 311 calculates a third parameter W3, which is obtained by updating the second parameter W2, based on the second parameter W2 and the gradient gW. Specifically, the learning processing unit 311 calculates the third parameter W3 based on a following equation (3). Here, γ is a learning rate, and a constant of 1 or less is set, for example.

$$W3 = W2 - \gamma \times gW \tag{3}$$

Next, the learning processing unit 311 calculates a difference value between the first parameter W1 and the third parameter W3 as new cumulative update information $dW2_{new}$ by a following equation (4). Here, the cumulative update information $dW2_{new}$ can be expressed by a relational expression of an equation (4)' by transforming a following equation (4) based on the equations (1) and (3).

$$dW2_{new} = W3 - W1 \tag{4}$$

$$= dW2 - \gamma \times gW \tag{4}'$$

Next, the learning processing unit 311 stores the calculated cumulative update information $dW2_{new}$ in the second memory 20 in association with information that identifies the target layer. When the cumulative update information $dW2_{new}$ is stored in the second memory 20, the compression/decompression unit 312 performs compression processing A22 on the cumulative update information $dW2_{new}$. Then, the cumulative update information $dW2_{new}$ is stored as the cumulative update information dW2 in the second memory 20. In the second memory 20, when the existing cumulative update information dW2 associated with the same target layer exists, the existing cumulative update information dW2 is overwritten by the cumulative update information $dW2_{new}$.

The learning processing unit 311 executes the above backward processing a particular number of times for each layer of the model 11. Then, after the learning processing of each layer is completed, the learning processing unit 311 repeats the above forward processing and backward processing by switching the training data 51a or the like. That is, the learning processing unit 311 starts selecting the target layer from the output layer 113 again.

In this case, since the cumulative update information dW2 corresponding to the target layer is stored in the second memory 20, the learning processing unit 311 reads the corresponding cumulative update information dW2 from the second memory 20. Next, the learning processing unit 311 calculates the second parameter W2 by adding the cumulative update information dW2 to the first parameter W1 read from the first memory 10 based on the above equation (1).

Here, as is clear from the above equation (4), the second parameter W2 has the same value as the updated third parameter W3 calculated in the previous learning processing for the target layer. That is, the second parameter W2 represents the latest parameter in which the results of the learning processing so far are reflected. Then, the learning processing unit 311 calculates the cumulative update information $dW2_{new}$ using the newly calculated third parameter W3 by the above equations (2) to (4), and stores the cumulative update information $dW2_{new}$ in the second memory 20 as the cumulative update information dW2.

The learning processing unit 311 repeatedly executes the above-mentioned processing for each layer of the model 11 to maintain (store) the parameter W of the model 11 in the first memory 10 and executes the learning processing for updating the parameter W by using the second memory 20. Therefore, in the arithmetic apparatus 1 of the present embodiment, even when a storage medium such as a NAND memory or SSD having an upper limit of the number of times of rewriting is used as the first memory 10, while the number of times of rewriting the first memory 10 is suppressed, the learning processing of the model 11 can be performed efficiently.

Further, the update unit 313 executes update processing A31 that reflects the cumulative update information dW2 stored in the second memory 20, in parameters of the model 11 stored in the first memory 10 according to progress of the learning processing. Specifically, the update unit 313 reflects (adds) the cumulative update information dW2 of each layer stored in the second memory 20 in the first parameter W1 of the corresponding layer of the model 11. In addition, the update unit 313 invalidates (for example, clears) the cumulative update information dW2 stored in the second memory 20 with the update of the model 11.

As a result, the first parameter W1 of each layer of the model 11 stored in the first memory 10 can be updated to the latest state. When the cumulative update information dW2 is read from the second memory 20, the compression/decompression unit 312 executes the decompression processing A21 on the cumulative update information dW2.

A timing at which the update unit 313 executes the update processing can be arbitrarily set. As an example, the update unit 313 may execute the update processing for one piece of training data 51a at the timing when the above-mentioned learning processing is completed for all the layers constituting the model 11.

Alternatively, for example, when a data set including a large amount of the training data 51a is divided into a plurality of subsets, the update unit 313 may execute the update processing at the timing when the learning processing is completed for a particular number of subsets. Alternatively, the update unit 313 may execute the update processing at the timing when the learning processing is completed for all the subsets (the timing when the processing for one epoch is completed), or may execute the update processing at the timing when the learning processing is completed for all the subsets a particular number of times (the timing when a particular number of processing is completed).

For example, if the total number of pairs of input data and ground truth label prepared as the training data 51a is 100 million and the training data 51a is divided into 10,000 subsets, in the training for one epoch, the processing will be performed 10,000 times for each subset. In this case, the update unit 313 may execute the update processing every 10,000 times of the processing (that is, the processing of one subset), or may execute the update processing every processing of a particular number of subsets.

For example, the update unit 313 may execute the update processing at the timing when the processing of one epoch is executed. Further, in the case where the training data 51a of one epoch described above is repeatedly processed 100 times through one time of the learning processing, the update unit 313 may execute the update processing at the timing when the processing of 100 epochs is completed.

Further, the timing of the update processing is not limited to the switching timing of the training data 51a described above and an epoch boundary. For example, the update unit 313 may execute the update processing based on an arbitrary index such as an amount of change in the loss value or execution time (every hour, etc.). As an example, the update unit 313 may execute the update processing when the amount of change in the loss value falls within a threshold range indicating a minute amount.

Moreover, the timing of the above-mentioned update processing may be combined. For example, when the training data 51a of one epoch is repeatedly processed 100 times, the update unit 313 may perform the update processing for each epoch, and also perform the update processing on a condition that the amount of change in the loss value is within the threshold range.

Figure 5:
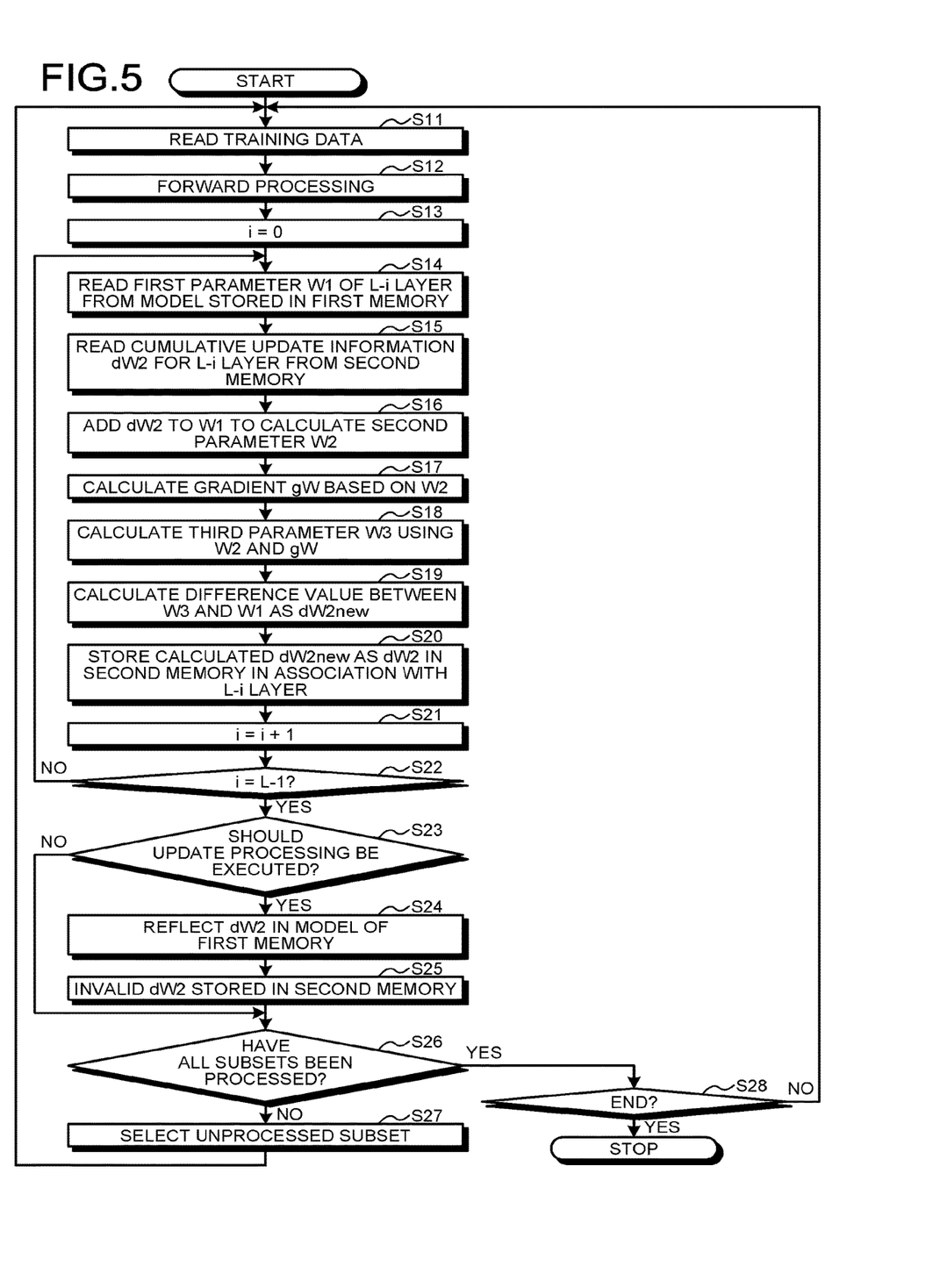
FIG. 5 is a flowchart illustrating an example of learning processing performed by the controller of the embodiment.

Hereinafter, an example of the learning processing performed by the controller 30 will be described. FIG. 5 is a flowchart illustrating an example of the learning processing performed by the controller 30. In this processing, it is assumed that the data set of the training data 51a is divided into a plurality of subsets. Further, an example will be described in which the number of layers of neural network constituting the model 11 stored in the first memory 10 is vL (however, L≥3) including the input layer 111, as illustrated in FIG. 2.

First, after the learning processing unit 311 starts the learning processing, the learning processing unit 311 reads one piece of training data 51a included in one subset to be processed (S11). Next, the learning processing unit 311 inputs the training data 51a read in S11 into the model 11 stored in the first memory 10, and executes forward processing for evaluating the loss value at the current parameter W (S12).

Subsequently, the learning processing unit 311 sets an index i for designating the target layer to "0" (S13), and executes the processing S14 to S22.

First, the learning processing unit 311 reads the first parameter W1 of an L−i layer, which is the target layer, from the model 11 stored in the first memory 10 (S14). Further, the learning processing unit 311 reads the cumulative update information dW2 corresponding to the L−i layer from the second memory 20 (S15). The compression/decompression unit 312 performs decompression processing on the cumulative update information dW2 when the cumulative update information dW2 is read from the second memory 20.

Subsequently, the learning processing unit 311 calculates the second parameter W2 by adding the cumulative update information dW2 read in S15 to the first parameter W1 read in S14 based on the above equation (1) (S16). Next, the learning processing unit 311 inputs the second parameter W2 to the evaluation function of the above equation (2) and calculates the gradient gW (S17).

Subsequently, the learning processing unit 311 calculates the updated third parameter W3 from the second parameter W2 and the gradient gW based on the above equation (3) (S18). Next, the learning processing unit 311 calculates the difference value between the third parameter W3 and the first parameter W1 as the cumulative update information $dW2_{new}$ based on the above equation (4) (S19). Then, the learning processing unit 311 stores the calculated cumulative update information $dW2_{new}$ as the new cumulative update information dW2 in the second memory 20 in association with information indicating the L-i layer (S20), and proceeds to S21. The compression/decompression unit 312 performs compression processing on the cumulative update information dW2 when the cumulative update information dW2 is written in the second memory 20.

Subsequently, the learning processing unit 311 increments the index i by 1 (S21), and then determines whether a value of the index i has reached L-1, that is, whether the value of the index i has reached the input layer 111 (S22). Here, when the value of the index i has not reached L-1 (S22: No), the learning processing unit 311 returns the processing to S14. As a result, each of the processing S14 to S22 is executed for all the layers from the output layer 113 to the input layer 111.

On the other hand, when it is determined that the value of the index i has reached L-1 (S22: Yes), the update unit 313 determines whether or not it is time to execute the update processing (S23).

Here, for example, when execution of the update processing is set for each epoch, the update unit 313 determines that it is time to execute the update processing (S23: Yes). In this case, the update unit 313 executes the update processing that reflects the cumulative update information dW2 of each layer stored in the second memory 20 in the model 11 stored in the first memory 10 (S24). Next, the update unit 313 invalidates the cumulative update information dW2 stored in the second memory 20 (S25), and then proceeds the processing to S26. Here, too, the compression/decompression unit 312 performs the decompression processing on the cumulative update information dW2 when the cumulative update information dW2 is read from the second memory 20.

Further, in a case where the amount of change does not satisfy an execution condition of the update processing, for example, when execution of the update processing is set according to the amount of change in the loss value, the update unit 313 determines that now is not the time for executing the update processing (S23: No), and proceeds to S26.

In the following S26, the learning processing unit 311 determines whether or not all the subsets have been processed (S26). Here, if there are unprocessed subsets (S26: No), the learning processing unit 311 selects one of the unprocessed subsets (S27) and returns the processing to S11. As a result, each of the processing S12 to S25 is executed for each piece of the training data 51a included in the new subset.

If all the subsets are processed (S26: Yes), that is, if the processing for one epoch is completed, the processing proceeds to S28.

Here, the learning processing unit 311 determines whether or not to end the learning processing (S28). For example, when processing for 100 epochs is set, the learning processing unit 311 continues the processing above until the processing for 100 epochs is completed (S28: No). In this case, the learning processing unit 311 returns the processing to S11 to start a series of processing again for the first data set of the new training data 51a. On the other hand, when an end condition of the learning processing is satisfied (S28: Yes), the learning processing unit 311 ends a series of above processing.

As described above, the arithmetic apparatus 1 according to the present embodiment performs the update processing for reflecting the cumulative update information dW2 stored in the second memory 20 in the model 11 of the first memory 10 not every time the first parameter W1 is updated but at the timing of, for example, one epoch. Therefore, the number of times of updating the model 11 stored in the first memory 10 can be suppressed low compared to a method of updating the model 11 every time the first parameter W1 is updated. However, since the cumulative update information dW2 is cumulative results of the learning processing so far as described above, accuracy of the model 11 can be maintained high even if the number of times of updating the model 11 is reduced.

Figure 6:
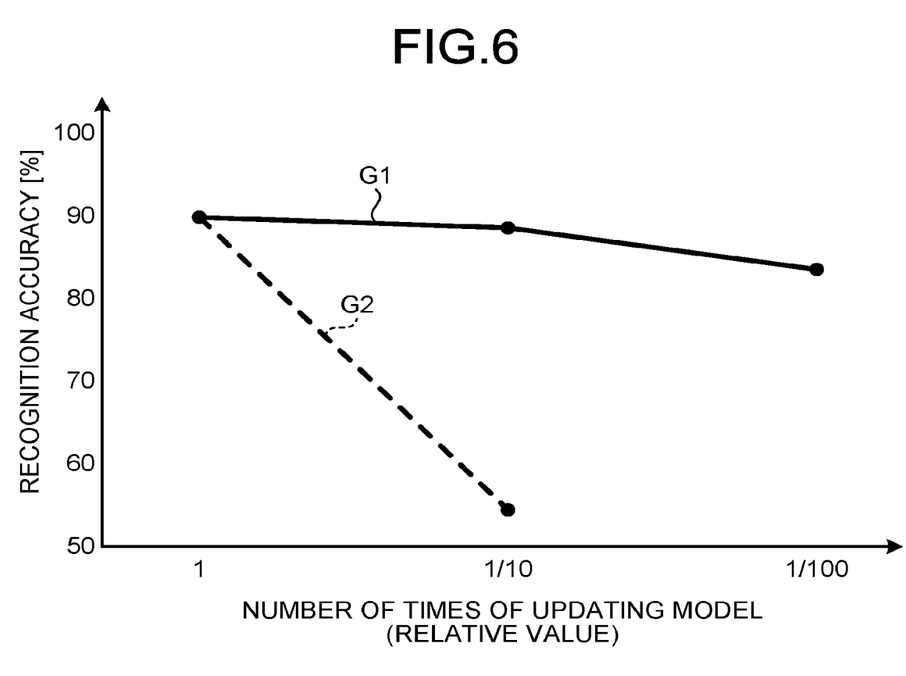
FIG. 6 is a diagram for explaining relationship between the number of times of updating a model and accuracy according to the embodiment.

Here, relationship between the number of times of updating the model 11 and the accuracy will be described with reference to FIG. 6. FIG. 6 is a diagram for explaining the relationship between the number of times of updating the model 11 and the accuracy according to the embodiment.

Note that FIG. 6 schematically illustrates the relationship between the number of times of updating and recognition accuracy based on simulation results when machine learning for image recognition is performed. Here, the recognition accuracy means a correct answer rate when recognition processing is performed for a particular number of images. Further, in FIG. 6, for a comparison with the model 11, the number of times of updating and the recognition accuracy of a model (hereinafter, also referred to as a reference model) generated by a method of updating the model 11 every time the first parameter W1 is updated are also illustrated in the figure.

In FIG. 6, the horizontal axis represents a relative value (ratio) of the number of times of updating between the model 11 and the reference model, and the vertical axis represents the recognition accuracy (%). Further, in FIG. 6, a graph G1 represented by a solid line indicates the relationship between the number of times of updating the model 11 and the recognition accuracy according to the embodiment, and a graph G2 represented by a broken line indicates the relationship between the number of times of updating the reference model and the recognition accuracy. In FIG. 6, the number of times of updating each of the model 11 and the reference model, which have the same recognition accuracy, is set to "1".

In the model 11 according to the embodiment, even when the number of times of updating is reduced from the state of "1" to "1/10", the number of times of learning is not the same as the number of times of updating, and results of a plurality of times of the learning processing by the next update timing are reflected in the model 11 as the cumulative update information dW2. Therefore, as indicated by the graph G1, even when the number of times of updating is reduced to "1/10", the recognition accuracy when the model 11 is used can be maintained in the same degree as the recognition accuracy when the number of times of updating is "1". Similarly, even when the number of times of updating is reduced to "1/100", high recognition accuracy can be maintained.

On the other hand, in the case of the reference model, when the number of times of updating is reduced, the number of times of learning is the same as the number of times of updating. Therefore, the recognition accuracy decreases according to the number that is reduced from the number of times of updating. Therefore, as illustrated in the graph G2, in the case of the reference model, if the number of times of updating is reduced to "1/10", the recognition accuracy deteriorates significantly.

As described above, the arithmetic apparatus 1 according to the present embodiment can generate the model 11 with high accuracy even when the number of times of updating the model 11, that is, the number of times of rewriting the first memory 10 is suppressed. Therefore, the arithmetic apparatus 1 can efficiently execute the learning processing of the model 11.

As described above, the arithmetic apparatus 1 according to the present embodiment executes learning processing that updates the first parameter W1 based on the loss value obtained by inputting the training data 51a into the model 11 stored in the first memory 10, and stores the cumulative update information dW2 indicating the difference of the first parameter W1 before and after the update in the second memory 20. In addition, the arithmetic apparatus 1 executes the learning processing using the second parameter W2 in which the cumulative update information dW2 stored in the second memory 20 is reflected in the first parameter W1 read from the model 11 stored in the first memory 10, and stores the difference between the third parameter W3 obtained by updating the second parameter W2 and the first parameter W1, in the second memory as the cumulative update information.

According to this configuration, the learning processing that updates the first parameter W1 can be executed using the second memory 20 while maintaining the first parameter W1 of the model 11 stored in the first memory 10. As a result, in the arithmetic apparatus 1 according to the embodiment, the learning processing can be performed while the number of times of rewriting of the first memory 10 is suppressed even when a storage medium such as a NAND memory or SSD having an upper limit of the number of times of rewriting is used as the first memory 10. Therefore, according to the arithmetic apparatus 1 according to the embodiment and the arithmetic method executed by the arithmetic apparatus 1, learning can be performed efficiently. Further, according to the technique according to the embodiment, even if the model 11 has a huge number of parameters of deep learning or the like, learning of the model 11 can be performed using a storage medium such as a NAND memory or SSD that can be accessed at a higher speed than an HDD. Therefore, the learning speed can be increased.

According to the embodiments described above, machine learning can be performed efficiently.

What is claimed is:

1. An arithmetic apparatus comprising:
a non-volatile first memory configured to store a model to be trained;
a volatile second memory having a smaller storage capacity than the first memory; and
a processor configured to:
execute learning processing that updates a first parameter of the model based on a loss value obtained by inputting training data into the model stored in the first memory;
perform processing by using the first and second memories while suppressing a number of times of rewriting of the first memory, for each of all layers of neural network constituting the model, the processing including:
reading the first parameter of the model stored in the first memory;
calculating a second parameter in which cumulative update information stored in the second memory is reflected in the first parameter; and
storing a difference between a third parameter obtained by updating the second parameter and the first parameter, in the second memory as the cumulative update information;
determine whether the processing is performed on all the layers of the neural network constituting the model; and
reflect, in response to the processing being performed on all the layers, the cumulative update information stored in the second memory in the model stored in the first memory to update the first parameter stored in the first memory.

2. The arithmetic apparatus according to claim 1, wherein the processor is further configured to compress a data amount of the cumulative update information and to store the compressed cumulative update information in the second memory.

3. The arithmetic apparatus according to claim 2, wherein the processor is further configured to compress the data amount of the cumulative update information by pruning or quantization.

4. The arithmetic apparatus according to claim 2, wherein the processor is further configured to losslessly compress the data amount of the cumulative update information and to decompress the losslessly compressed cumulative update information when the cumulative update information is read from the second memory.

5. The arithmetic apparatus according to claim 1, wherein the processor is further configured to execute the update processing every particular number of epochs.

6. The arithmetic apparatus according to claim 1, wherein the processor is further configured to execute the update processing according to an amount of change of the loss value.

7. The arithmetic apparatus according to claim 1, wherein the first memory includes a NAND flash memory.

8. The arithmetic apparatus according to claim 1, wherein the second memory includes a DRAM or an SRAM.

9. An arithmetic method executed by an arithmetic apparatus, the arithmetic apparatus including a non-volatile first memory configured to store a model to be trained, a volatile second memory having a smaller storage capacity than the first memory, and a processor, the arithmetic method comprising:
executing, via the processor, learning processing that updates a first parameter of the model based on a loss value obtained by inputting training data into the model stored in the first memory;
performing, via the processor, processing by using the first and second memories while suppressing a number of times of rewriting of the first memory, for each of all layers of neural network constituting the model, the processing including:

reading the first parameter of the model stored in the first memory;

calculating a second parameter in which cumulative update information stored in the second memory is reflected in the first parameter; and storing a difference between a third parameter obtained by updating the second parameter and the first parameter, in the second memory as the cumulative update information;

determining, via the processor, whether the processing is performed on all the layers of the neural network constituting the model; and reflecting, via the processor, in response to the processing being performed on all the layers, the cumulative update information stored in the second memory in the model stored in the first memory to update the first parameter stored in the first memory.

10. The arithmetic method according to claim 9, further comprising compressing, via the processor, a data amount of the cumulative update information and storing the compressed cumulative update information in the second memory.

11. The arithmetic method according to claim 10, further comprising compressing, via the processor, the data amount of the cumulative update information by pruning or quantization.

12. The arithmetic method according to claim 10, further comprising:

losslessly compressing, via the processor, the data amount of the cumulative update information; and decompressing, via the processor, the losslessly compressed cumulative update information when the cumulative update information is read from the second memory.

13. The arithmetic method according to claim 9, further comprising executing, via the processor, the update processing every particular number of epochs.

14. The arithmetic method according to claim 9, further comprising executing, via the processor, the update processing according to an amount of change of the loss value.

* * * * *